3,491,912
METHOD OF SEALING PRESSURE VESSEL PENETRATIONS

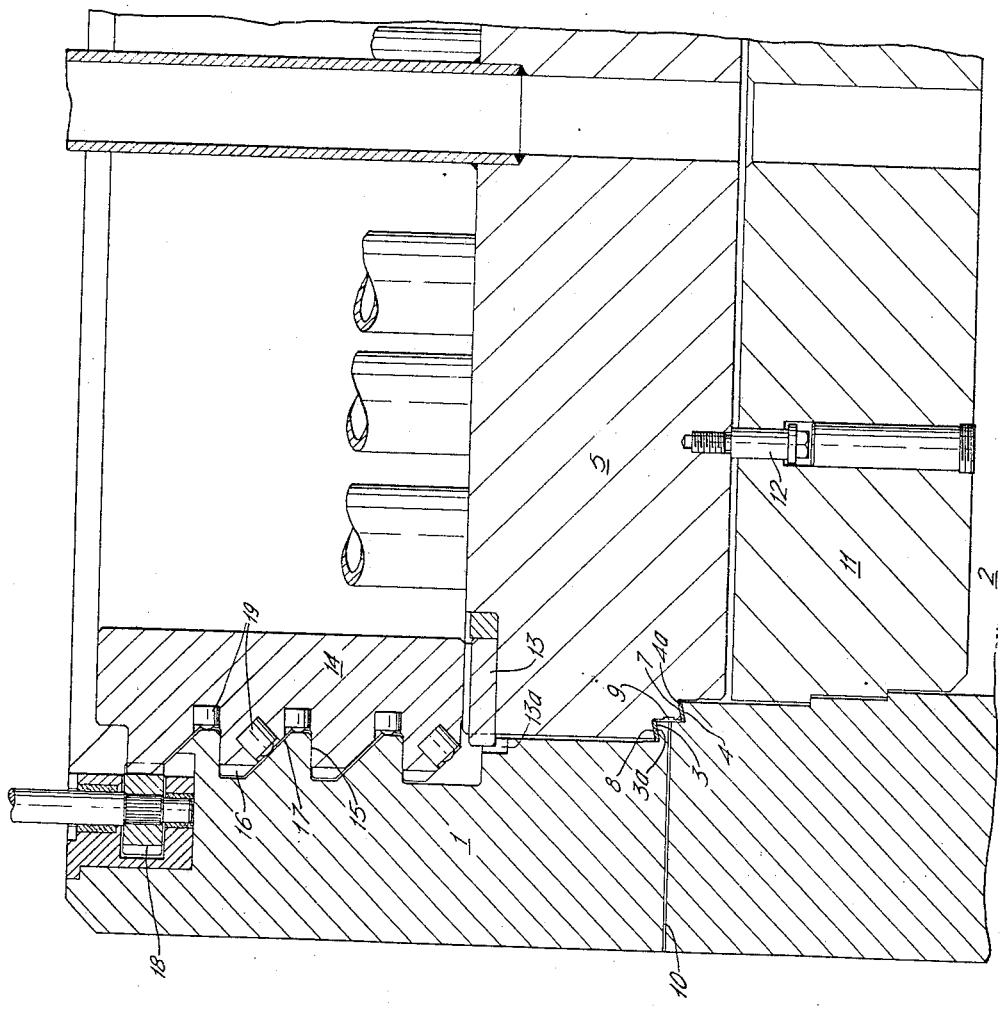

Raymond Kenneth Hilton, Poole, Dorset, England, assignor to United Kingdom Atomic Energy Authority, London, England
Filed July 24, 1967, Ser. No. 655,624
Claims priority, application Great Britain, Aug. 3, 1966, 34,817/66
Int. Cl. B65d 41/22
U.S. Cl. 220—39                                   5 Claims

ABSTRACT OF THE DISCLOSURE

A pressure vessel penetration is closed by a plug which co-operates with a gasket to apply a sealing deformation to the gasket by virtue of its position in the penetration and its own weight relative to the gasket. Such deformation is maintained when the vessel is pressurised by means of a keeper which need not normally apply a positive load to the gasket via the plug.

BACKGROUND OF INVENTION

This invention relates to arrangements for sealing large diameter penetrations in pressure vessels by means of removable closure devices. Pressure vessel closures usually involve dual members which fit into the penetration and provide both leak tightness and mechanical strength. For the former, some kind of deformable gasket device is usually necessary which in turn calls for means for applying a compressive load to the gasket to make the seal, such load being applied in direction counter to that in which the pressure fluid within the vessel acts.

Closures of this general kind, whilst readily applicable to small diameter penetrations, present special problems on larger diameters, e.g. of the order of 6 feet or more, and for sustaining high pressures. In such diameters and for high loadings it is virtually impossible to load the gasket satisfactorily except perhaps by the sequential tightening of bolt or stud fastening devices, which introduce stress limitation problems at high pressure.

SUMMARY OF INVENTION

The present invention stems from the idea of using, in conjunction with the gasket means, a closure plug which, in relation to the properties of the gasket means, applies the deforming pressure by virtue of its position in the penetration. Now in penetrations of large diameter the closure means will in any case tend to be massive and if a gasket means is selected for its ability to deform due to the presence of the closure plug in a manner to effect a leak tight seal, the problem of axially loading the gasket means does not arise. Moreover, provided that the gasket means is capable of sustaining its leak tight property once deformed, even after slight outward displacement of the closure means, the latter can be kept in place by (but not necessarily loaded by) a removable keeper connected to the penetration behind the closure means.

According to the invention, there is provided a method of sealing a pressure vessel penetration by means of a closure means and a gasket means, the latter being of the kind deformable to effect a seal which withstands small axial displacements of the closure means on its seating, said method comprising loosely inserting a closure plug into the penetration to impart a sealing deformation to the gasket against the vessel structure and detachably connecting to the vessel wall a keeper effective to transmit to the pressure vessel wall thrust exerted on the closure plug by the pressure vessel contents.

Preferably the keeper is a ring having a fast screw thread which may be driven by gear teeth cut in the thread crests.

BRIEF DESCRIPTION OF THE DRAWING

In order that the invention may be better understood one embodiment thereof will now be described with reference to the accompanying drawing which is one half of an axial cross section taken through the pressure vessel penetration in a pressure vessel for containing a nuclear reactor.

DESCRIPTION OF THE PREFERRED EMBODIMENT

In the drawing, the neck of the pressure vessel is shown at 1 and the penetration at 2. The neck 1 has a pair of annular seal faces 3, 4 on which are placed sealing rings 3a, 4a of the kind known as "Conoseals". Into the penetration is loosely inserted a closure plug 5 with steps 7, 8 such that, when the plug is lowered into position, the rings 3a, 4a are trapped between the engaging steps and seal faces and deform under the weight of the plug 5. In the periphery of the vessel between the steps 7, 8 a groove 9 is formed to allow leakage of the inner seal to be detected by sampling the internal atmosphere via capillary bore 10.

From the underside of the plug 5 depends a shield block 11 by studs 12.

On the upper side of the closure is mounted a key 13 which is extendable in a slot 13a in the wall of the penetration to prevent the plug from rotating.

In the upper part of the penetration wall is mounted a keeper 14 which takes the form of an externally threaded thrust ring.

The screw thread 15 provided is a quick thread with gear teeth 16 cut into the thread profile. A complementary screw thread 17 is cut into the wall of the penetration which also supports a number of driving pinions 18 (of which only one is shown). The threaded ring is thus driven by rotation of the pinions 18. To minimize the driving effort involved a plurality of friction reducing devices 19 are let into parts of the ring plug.

In use, the plug 5 is placed in the penetrations and the sealing rings deform. The keeper is then screwed down until its underside just clears the top of the plug. Under pressure the plug can be lifted slightly but any significant upward displacement is restricted by the keeper.

I claim:
1. A pressure vessel having an opening therein, an annular surface defining the opening, a shoulder on said annular surface, an annular deformable gasket on said shoulder, means for loading the gasket consisting essentially of a closure plug fitting the opening and having a complementary shoulder, said plug being heavy enough in relation to the deformability of the gasket such that the gasket is deformed between said shoulder and said complementary shoulder to form a seal, a keeper releasably connected to the pressure vessel to bear on the side of the closure plug remote from the vessel interior, thereby to transmit to the vessel forces from the vessel interior which act on the closure member.

2. A pressure vessel having an opening therein, a closure device in said opening, a resiliently deformable gasket between surfaces of the closure plug and the walls of the said opening, said gasket being deformed within the limits of its resiliency to form a seal under the weight of the closure plug alone in the absence of other deforming means, and a keeper arranged to resist forces tending to lift the closure and to transmit such forces to the pressure vessel.

3. A closure device as claimed in claim 2 in which the keeper is a ring having a screw threaded for engagement with the pressure vessel structure.

4. A closure device as claimed in claim 3 in which the keeper carries a ring gear rotatable by a pinion capture in the structure.

5. A closure device as claimed in claim 3 in which the closure plug has standpipes communicating the high pressure side of the closure plug with valved access ports.

No references cited.

JAMES B. MARBERT, Primary Examiner